(12) United States Patent
Mol

(10) Patent No.: US 10,018,524 B2
(45) Date of Patent: Jul. 10, 2018

(54) LOAD DETERMINING SYSTEM FOR A ROLLING ELEMENT BEARING

(71) Applicant: Aktiebolaget SKF, Gothenburg (SE)

(72) Inventor: Hendrik Anne Mol, Sleeuwijk (NL)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/533,545

(22) PCT Filed: Dec. 2, 2015

(86) PCT No.: PCT/EP2015/078297
§ 371 (c)(1),
(2) Date: Jun. 6, 2017

(87) PCT Pub. No.: WO2016/096418
PCT Pub. Date: Jun. 23, 2016

(65) Prior Publication Data
US 2017/0336278 A1 Nov. 23, 2017

(30) Foreign Application Priority Data
Dec. 16, 2014 (GB) .................... 1422345.7

(51) Int. Cl.
*G01L 1/10* (2006.01)
*G01L 5/00* (2006.01)
(Continued)

(52) U.S. Cl.
CPC .......... *G01L 5/0023* (2013.01); *F16C 19/522* (2013.01); *F16C 41/007* (2013.01);
(Continued)

(58) Field of Classification Search
CPC ........ G01L 5/0023; G01L 1/12; F16C 19/522; F16C 41/007; F16C 2326/02; G01M 17/065
(Continued)

(56) References Cited

U.S. PATENT DOCUMENTS 6,259,179 B1 * 7/2001 Fukuyama .......... F16C 32/0451
310/90.5
2005/0162154 A1 * 7/2005 Mol ........................ G01P 3/487
324/174
(Continued)

FOREIGN PATENT DOCUMENTS

EP 1130362 A2 9/2001
EP 1672372 A1 6/2006
(Continued)

*Primary Examiner* — Max Noori
(74) *Attorney, Agent, or Firm* — Bryan Peckjian; SKF USA Inc. Patent Dept.

(57) ABSTRACT

A load determining system having a sensorized rolling element bearing in a hub unit for wheels. The bearing includes a first ring and a second ring as an inner and outer ring. The first and second ring may be the inner ring, the other ring being the outer ring. The system includes at least two magnetic sensors attached to the first ring interact with a target wheel attached to the second ring. The system includes a signal processing unit configured to receive the magnetic sensor output of the at least one magnetic sensor, to determine at least axial forces acting on the bearing based on the amplitude of the magnetic sensor output and to calculate averages value of the outputs of the at least two magnetic sensors and to calculate a logarithm of a ratio of the average values to determine a load acting on the bearing.

11 Claims, 7 Drawing Sheets

(51) Int. Cl.
  *F16C 19/52*   (2006.01)
  *F16C 41/00*   (2006.01)
  *G01M 17/06*   (2006.01)
  *G01L 1/12*    (2006.01)

(52) U.S. Cl.
  CPC ............ *G01L 1/12* (2013.01); *G01M 17/065* (2013.01); *F16C 2326/02* (2013.01)

(58) Field of Classification Search
  USPC .................................................. 73/862.625
  See application file for complete search history.

(56) References Cited

U.S. PATENT DOCUMENTS

| | | | |
|---|---|---|---|
| 2008/0243427 A1 | 10/2008 | Ono | |
| 2009/0136335 A1* | 5/2009 | Nakazeki | F16C 19/52 |
| | | | 415/13 |
| 2011/0234033 A1* | 9/2011 | Filatov | F16C 32/0485 |
| | | | 310/90.5 |
| 2013/0223778 A1 | 8/2013 | Takahashi et al. | |
| 2014/0252899 A1* | 9/2014 | Looser | F16C 32/0402 |
| | | | 310/90.5 |

FOREIGN PATENT DOCUMENTS

| | | |
|---|---|---|
| EP | 1995580 A1 | 11/2008 |
| FR | 2794504 A1 | 12/2000 |
| JP | 2006258801 A | 9/2006 |
| JP | 2007064328 A | 3/2007 |
| JP | 2008215977 A | 9/2008 |
| JP | 2008292275 A | 12/2008 |
| WO | 2011154016 A1 | 12/2011 |

* cited by examiner

LOAD DETERMINING SYSTEM FOR A ROLLING ELEMENT BEARING

CROSS REFERENCE

This is a United States National Stage Application claiming the benefit of International Application Number PCT/EP2015/078297 filed on Dec. 2, 2015, which claims the benefit of British Patent Application 1422345.7 filed on Dec. 16, 2014, both of which are incorporated herein by reference in their entireties.

FIELD OF THE INVENTION

The invention relates to a load determining system for a rolling element bearing and to a method for determining a load on a rolling element bearing.

BACKGROUND OF THE INVENTION

Rolling element bearings are precision made components the stiffness of which is predictable in more than one direction such that the movement of the inner ring of the bearing with respect to the outer ring is predictable as a function of load, temperature and thermal parameters.

It is known to measure loads acting on bearings using strain gauges applied to bearing. The attachment of the strain gauges entails difficulties in the manufacturing. Load measurements on bearings require gluing of strain gauges to the bearing surfaces. This is time-consuming, costly and difficult to automate. Further, it is known to measure loads using Eddy Current Sensors. This solution is fairly expensive.

Wheel bearings specifically have both rows very close to each other, so the contact lines overlap each other inside the steel structure. At the measurement position, the deformations from both rows overlap. Therefore, one cannot tell which row of the bearing is loaded. Hence, it is not possible to tell if the vehicle is cornering left or right.

For rotating outer ring bearings, the strain signal would have to be transferred wirelessly.

Methods employing non-contact sensors such as magnetic sensors are known in the prior art, e.g. disclosed in the document JP 2008-215977 A.

In this technology, a sensor system optimized for determining a wheel speed for ABS (Anti-lock Braking System) or slip control employing the frequency of the sensor signal is used to additionally determine the load acting on the bearing. For this purpose, the amplitude of the signal obtained by the magnetic sensor is read out. The amplitude of the magnetic field acting between a magnetic sensor and an angle target ring depends on the axial distance between these elements and is used to determine the relative axial position of the rings.

Commercially available wheel hub units with sensors are optimized for wheel speed detection and the period of the magnetically active pattern on or in the target ring is about 7 mm or more. This period will also be referred to as the "wavelength" of the target ring in the following. For typical target ring diameters of 30 mm or more, this pitch leads to a sufficient angular resolution and it is ensuring a sufficiently high signal-to-noise ratio and neatly detectable pulses. The relatively large wavelength ensures a good signal to noise ratio within the elastic movement of the bearing under any load and within the practical distance variation due to placing tolerances of the sensor, but does not allow a very accurate sensing of the load as it varies relatively little with the displacement between the magnetic ring and the magnetic sensor. A shorter wavelength will allow an improved change with distance.

When using standard target wheels for load detection as disclosed e.g. in JP 2008-215977 A, the characteristic function describing the dependency of the signal amplitude on the distance has a fairly shallow slope such that the resolution in the distance detection is low. The reason for this is obvious: since standard sensor wheels are optimized for wheel speed detection, the signal should be unaffected by variations in the distance as far as possible.

On the other hand, the application PCT/EP2010/00345 discloses a method employing strain gauges attached to the inner ring or to the outer ring of the bearing in order to measure elastic deformations of the bearing. The average local deformation is a measure of the load variation with respect to a baseline. However, the baseline depends on temperature and thermal gradients induced by friction heat such that it is normally impossible to derive absolute loads from absolute strains.

As a consequence, both methods are unsatisfactory. While the displacement sensor method is unable to account of effects of local strains or thermal expansions, the conventional method using strain gages has problems in determining absolute values for the load.

The document EP 1 672 372 A1 teaches to detect the load of a rolling bearing using signals of sensors interacting with encoders. The document EP 1 130 362 A2 teaches a method of manufacturing a magnetic encoder with a pitch of 1.5 mm. The document US 2008/243427 A1 discloses an encoder ring having a magnetic pattern which changes over a width of the encoder ring such that a displacement of the encoder ring parallel to its width direction results in a change of the offset of a signal detected by a sensor. The document FR 2 794 504 A1 discloses a further example of a sensorized rolling element bearing.

BRIEF SUMMARY OF THE INVENTION

The invention proposes a solution to the above-mentioned problems and starts from a load determining system including a rolling element bearing in a hub unit for wheels in which at least one, preferably two or more sensors, is or are measuring one or more relative distances between rotating and fixed components. The bearing includes a first ring and a second ring as an inner ring and an outer ring, wherein either one of the first and second ring may be the inner ring, the other ring being the outer ring. The system includes at least two magnetic sensors attached to the first ring to interact with a target wheel attached to the second ring. In such a combination, the amplitude of the magnetic interaction is an exponential function of the distance. Further, the system includes a signal processing unit configured to receive the magnetic sensor output of the at least two magnetic sensors, wherein the signal processing unit is configured to determine at least axial forces acting on the bearing based on the natural logarithm of the average amplitude of the magnetic sensor outputs and/or of the logarithm of a ratio of two such average amplitudes, preferably pertaining to sensors arranged at substantially opposite sides of the bearing.

It is proposed that the signal processing unit is configured to calculate an average value of the at least one magnetic sensor output or of each of the at least two magnetic sensor outputs and to calculate the width of the gap as a function of the average value. Preferably, the calculation is done by means of the logarithmic function to account for the natural exponential function in the real object's response.

The invention is applicable to various kinds of rolling element bearing used in hub units for automobiles, trucks or trains, including double-row roller bearings, tapered roller bearings, toroidal roller bearings, ball bearings or the like.

In a preferred embodiment of the invention, the signal processing unit is configured to calculate a logarithm of the average value in order to determine the width of the gap.

Further, it is proposed that the load determining system comprises multiple magnetic sensors arranged at different positions on a circumference of the first ring, wherein the signal processing unit is configured to calculate a tilt of the first ring with regard to the second ring based on the signals obtained from the magnetic sensors.

According to a further aspect of the invention, the load determining system comprises multiple magnetic sensors arranged at different positions on a circumference of the first ring, wherein the signal processing unit is configured to calculate a force vector describing a cornering load acting on the bearing.

Preferably, the signal processing unit is configured to determine a parameter relating to wear of the rolling element bearing and to generate a signal representative of a remaining bearing life based on the parameter.

A further aspect of the invention relates to the use of a load determining system according to one of the preceding claims as an ABS system in an automobile.

A yet further aspect of the invention relates to a vehicle including a bearing equipped with a load determining system according to one of the preceding claims.

In a further embodiment of the invention, it is proposed that the load determining system further includes at least one deformation sensor in addition to the magnetic sensor. The deformation sensor is adapted to be attached to an inner ring or to an outer ring of a bearing and the signal processing unit is configured to receive the deformation sensor output of the at least one deformation sensor. The deformation sensor may be formed as a standard strain gauge based on a patterned metallic foil, a semiconductor or piezoelectric strain gauge or a fiber Bragg grating (FBG) bonded to the inner ring or to the outer ring at least at one position, preferably at multiple positions homogeneously distributed over the circumference.

According to one aspect of the invention, the signal processing unit is further configured to receive the magnetic sensor output of the magnetic sensor and to calculate a bearing load as a function of the deformation sensor output and of a magnetic sensor output.

By using both kinds of sensor output, the invention is able to combine the advantages of both methods according to the prior art and to avoid their respective drawbacks as further described below.

By making use of the absolute distance measurement based on the magnetic sensor output, the method and the system are able to cancel the drift induced by friction heat but in addition provide a way to measure bearing loads and bearing systems with a number of elastic degrees of freedom which is insufficient to determine one or more load vectors. This happens in particular in double-row, compact wheel bearing units where two rolls of balls are in close proximity to each other. It is known that cornering loads lead to very similar strain patterns on the surface of the bearings for very different maneuvers and cannot be ordinarily determined using strain gages alone.

The target wheel is preferably used for measuring the angular position of the bearing. In the context of the invention, the target wheel may be any kind of wheel or gear magnetically interacting with the magnetic sensor so as to produce a sensor signal varying with the distance between the sensor and the wheel.

Preferably, the target wheel is arranged so as to face a sensing surface of the sensor with an axial gap. As a consequence, the distance and thus the sensor signal is a direct function of the axial displacement between the inner ring and the outer ring. However, it might be possible to use inclined sensing surfaces or sensing surfaces facing in a radial direction in other embodiments.

Preferably, the magnetic sensor is formed as a differential Hall sensor. A differential Hall sensor, preferably with back-magnet if used with a magnetically salient rotating ring, observes the spatial variation of the magnetic field due to the passage of the slotted magnetically permeable steel ring, target ring, disc or gear tooth or may be combined with a target ring containing a multitude of precisely produced north and south poles on its surface (a multi-pole magnetic ring with alternating magnetized regions similar to a Hallbach Array).

Further, it is preferred that the signal processing unit is configured to calculate a bearing load as a function of the amplitude of the magnetic sensor output. By restricting the signal processing to the amplitude, the processing is greatly simplified as compared to more complex solutions where more information, e.g. on the frequency spectrum is extracted from the signal.

Further, it is proposed that the signal processing unit is configured to process the sensor signals by removing a drift of the sensor signals caused by friction heat prior to calculating the average. The drift may be calculated in particular based on the deformation sensor signals.

A yet further aspect of the invention relates to a load detection method implemented by a system as described above. The method includes calculating an average value of the at least one magnetic sensor output and calculating the width of the gap as a function of the average value. According to the invention, the method may further comprise the step of calculating a bearing load as a function of the magnetic sensor output.

In order to perform ABS speed sensing, the rotating ring of the hub unit often already equipped with a multi-pole magnetic ring. The existing ABS speed sensing devices can be used as hardware to implement the invention in a cost-saving way. By placing additional hall sensors on the non-rotating ring, one can measure the displacement of the rotating ring, since the output signal of the hall sensor is exponentially related to the distance.

The above embodiments of the invention as well as the appended claims and figures show multiple characterizing features of the invention in specific combinations. The skilled person will easily be able to consider further combinations or sub-combinations of these features in order to adapt the invention as defined in the claims to his or her specific needs.

DETAILED DESCRIPTION OF THE INVENTION

Figure 1:
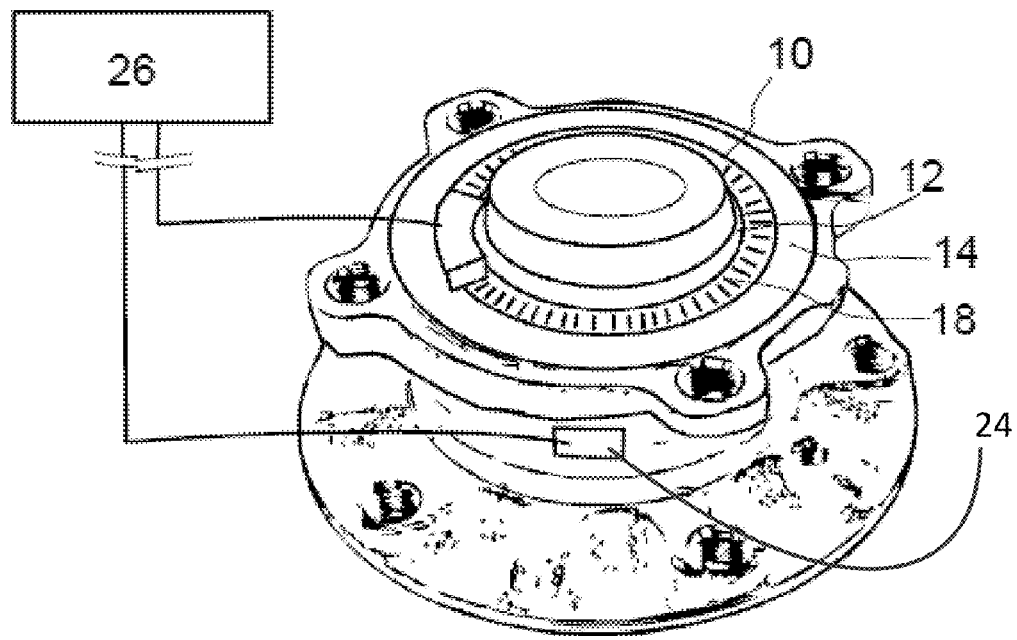
FIG. 1 is a schematic illustration of a load determining system used in a bearing integrated in an automobile hub unit.

FIG. 1 illustrates a hub unit of an automobile including a bearing 10 formed as a double row roller bearing. The bearing includes an inner ring 12 mounted on an axle and an outer ring 14. The hub unit is provided with integrated ABS (Anti-Lock Braking-System) and is provided with a target ring 18 formed as a slotted magnetically permeable steel ring and attached to the outer ring 14.

Figure 2:
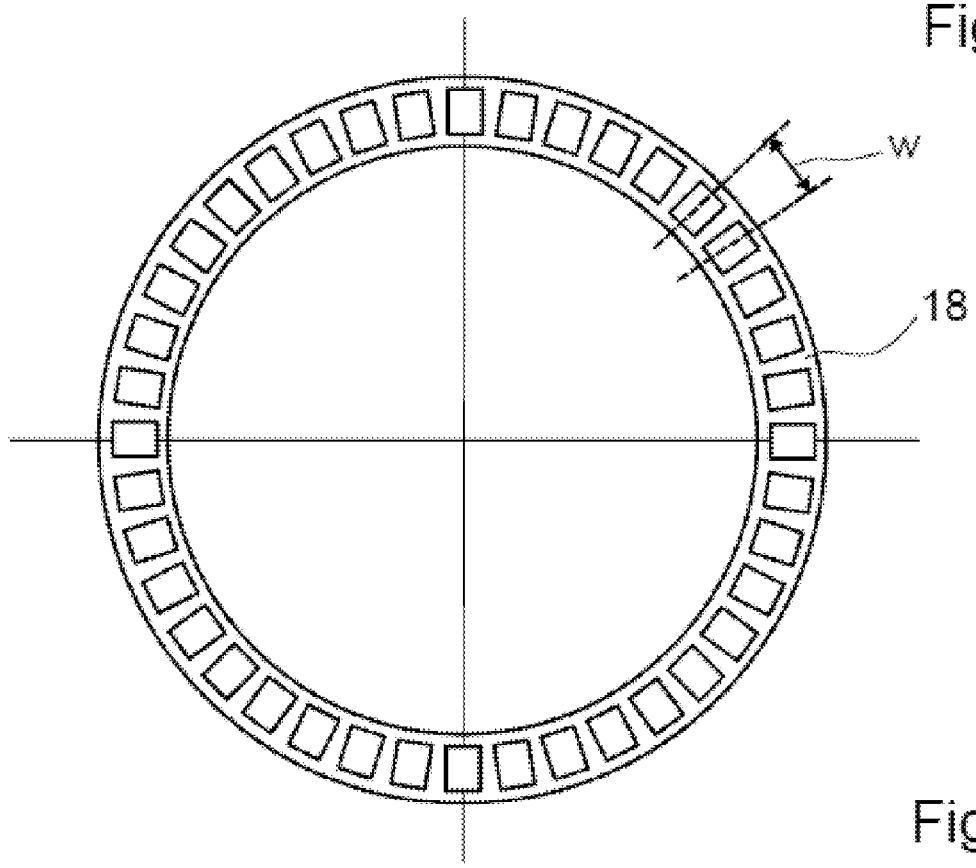
FIG. 2 is an target ring of the load determining system according to FIG. 1.

The target ring 18 is illustrated in FIG. 2 and is formed as a steel ring with slots and radially extending partition fingers separating the slots. The distance of the slots in a radial direction, i.e. the pitch w of the ring amounts to about 3 to 4 mm and is therefore smaller than the pitch of target rings used in standard ABS sensors wherein the period length is between 6 mm and 8 mm. Here and in the following, this period length will also be described as wavelength w. The pitch wavelength w may e.g. be measured along a curved section of a circle connecting the center points of the radially inner edges of the slots.

Figure 3:
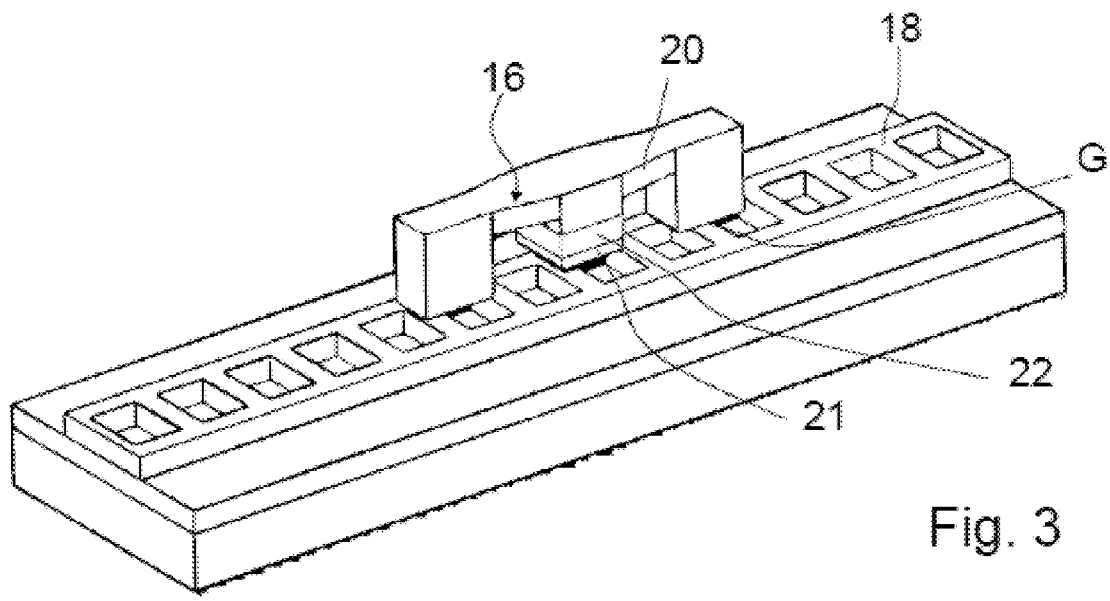
FIG. 3 is an adapted magnetic sensor of the load determining system according to FIGS. 1 and 2.

FIG. 3 is a schematic illustration of a sensor 16 formed as a differential Hall sensor with back magnet that observes the spatial variation of the magnetic field due to the passage of the slotted magnetically permeable steel target ring 18. As a matter of course, the invention is not limited to target rings of slotted magnetically permeable steel rings but may be used with steel discs, gear teeth or magnetized target rings containing a multitude of precisely produced north and south poles on its surface. In the latter case, a differential Hall sensor without back magnet is also applicable.

As illustrated in FIG. 3, the magnetic field sensor 16 comprises a yoke 20 in the circumferential direction of the target ring 18 and covering multiple wavelengths of the target ring 18. A back magnet 22 is provided in a center part of the yoke 20 and generates magnetic field lines passing through one or more differential magnetic field sensors 21 arranged in at least one of two magnetic circuits passing through one leg of the yoke 20 and through the target ring.

If an end portion of the yoke 20 facing the target ring 18 is arranged over the slot of the target ring, the magnetic field lines are interrupted or at least strongly weakened, whereas they easily pass a gap G between the target ring 18 and the end faces of the yoke 20 and of the differential magnetic field sensor 21 in the center thereof if the latter are arranged over a partitioning finger of the target ring 18.

If the target ring 18 rotates underneath the sensor 16, the magnetic field measured by the differential magnetic field sensor 21 is therefore oscillating with a frequency corresponding to the frequency of the passing slots of the target ring 18.

It is important to note that the amplitude of this oscillation depends on the width of the gap G between the sensor 16 and the target ring 18, more specifically between the end faces of the yoke 20 and of the differential magnetic field sensor and the partitioning fingers of the target ring 18. Essentially, the amplitude is an exponentially decreasing function of the width of this gap G. This width will also be called "distance" here and in the following.

Returning to FIG. 1, multiple sensors 16 of the type illustrated in FIG. 3 are provided on the circumference of the target ring 18. In the actual embodiment, 4 sensors 16 are provided at angles of 0°, 90°, 180° and 270° though only one of them is illustrated for the sake of simplicity. If the inner ring 12 of the bearing and hence the target ring 18 is tilted with respect to the outer ring 14, e.g. due to load acting on the bearing, the distances between the sensors and the target ring 18 will vary proportional to a sine of the tilt angle and will therefore obtain different values even in cases where the distances are identical in a configuration where the inner ring 12 and the outer ring 14 are perfectly aligned. The data obtained from the sensors 16 are processed pairwise using pairs or opposite sensors with an angular distance of 180°, wherein the widths of the gaps as determined by the measurement of the different sensors may be subtracted.

If, on the other hand, the inner ring 12 is axially displaced with regard to the outer ring 14, the distances observed by the distance sensor 16 will change in an identical way.

It is therefore possible to measure axial displacements of the rings and tilt angles of the rings with high precision using the sensors 16. The precision depends in particular on the decay constant of the exponential relationship between the distance and the amplitude of the sensor signals. A high value of the decay constant corresponds to a high precision and a low value of the decay constant corresponds to a low precision.

Sensor arrangements of the above described type are known from ABS systems in which the axial forces acting on the bearing, the axial displacement and the tilt angles are not of interest because the ABS system controls the longitudinal acceleration only, which is derived from the frequency of the sensor signals and not from the amplitude thereof. The inference of axial displacements or tilting is therefore diminished by using geometries with small exponential decay constants with values of around 0.5 mm−1. The value of the exponential decay constant depends in particular on the wavelength of the slots in the target ring 18. Long wavelengths correspond to a slow decay whereas short wavelengths correspond to a rapid decay. ABS sensors on the market usually employ wavelengths of around 6 mm to 8 mm. The inventors have found that better than 10% accuracy for the load measurement can be obtained even using existing ABS systems having relatively moderate magnetic ring quality and with a pitch period wavelength between 6 and 8 mm.

The ABS sensor according to a preferred embodiment of the invention employs smaller pitch wavelength w, in particular a wavelength w of less than 4 mm, preferably less than 3 mm so as to achieve values of the exponential decay constant of 2.0 mm-1 or more.

Besides of the magnetic sensors 16, the outer ring is provided with 4 equally spaced strain sensors 24 bonded to the radially outer surface of the outer ring 14. Depending on the field of application, the strain sensors 24 may be protected by plastic covers and/or embedded in recesses or in a circumferential groove.

The strain sensors 24 are sensitive to local deformations of the outer surface of the outer ring, in particular to stretching deformations. However, temperature changes or thermal gradients in the bearing inevitably lead to local deformations resulting from the thermal expansion of the material and these contributions are not directly dependent on the force acting on the bearing.

Further, the signals of the strain sensors 24 do not differentiate between various deformation modes of the outer ring 14. For example, a shear deformation in a first axial direction which might be caused by forces generated in a cornering maneuver to the right would lead to the same sensor output pattern as the one obtained in a cornering maneuver to the right because the two corresponding deformation patterns are mirror-images to one another with regard to a radial center plane of the ring, such that the sensors 24 arranged in this plane do not see this difference.

The strain sensors 24 have therefore very limited capabilities of detecting absolute values of the forces and cannot detect information on the direction in which the forces act.

The load determining system is provided with a signal processing unit 26 receiving the signals from the strain sensors 24 and from the magnetic sensors 16 and uses the combined sensor signals to determine the load acting on the bearing, wherein the different frequency components are treated separately as discussed in detail in WO2011/154016A1. The contents of the latter application relating to the processing of the signals of the strain sensors 24 are incorporated herewith by reference. In particular, the sensor signals are pre-processed by removing a drift of the sensor signals caused by friction heat prior to calculating the average.

The axial force components are mainly determined based on the signals received from the magnetic sensors 16 as described below.

Figure 4:
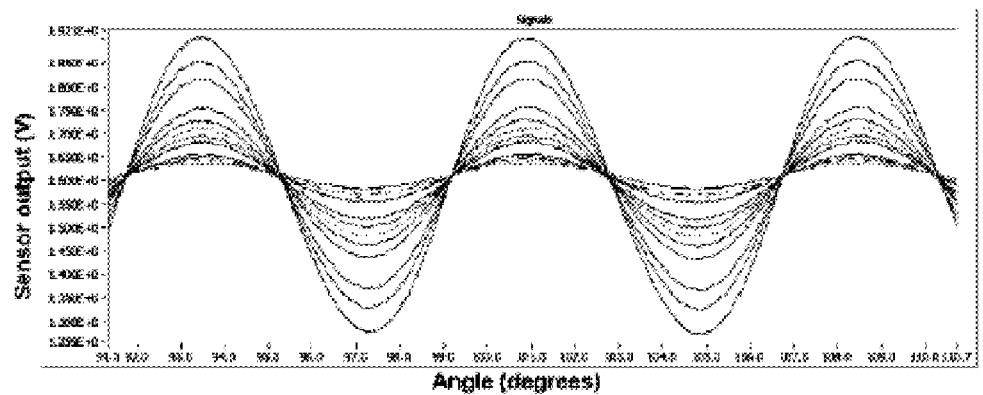
FIG. 4 is a schematic illustration of a sensor output of the sensor according to FIG. 3 for different widths of a gap.

FIG. 4 is a schematic illustration of a sensor output of the sensor according to FIG. 3 for different widths of a gap. As illustrated, the sensor output is roughly sinusoidal with a frequency corresponding to the frequency of the passing holes in the target ring. A high amplitude corresponds to a narrow gap G and a small amplitude to a wide gap G. Essentially, the differential Hall sensor's voltage variation from the passing target ring under it is a function of the distance or width of the gap G. The larger the distance, the smaller the signal becomes. FIG. 4 is a picture of the Hall sensor's voltage as function of angle for a steel target wheel with 48 slots (7.5 degrees for a completed sine), using e.g. the IC-MZ chip (a commercially available 2.000 mm differential sensor) and a 0.4 T to 1 T back magnet. The neighboring traces depict the signal when the sensor 16 is moved away in steps of 0.1 mm from the target ring 18.

Figure 5:
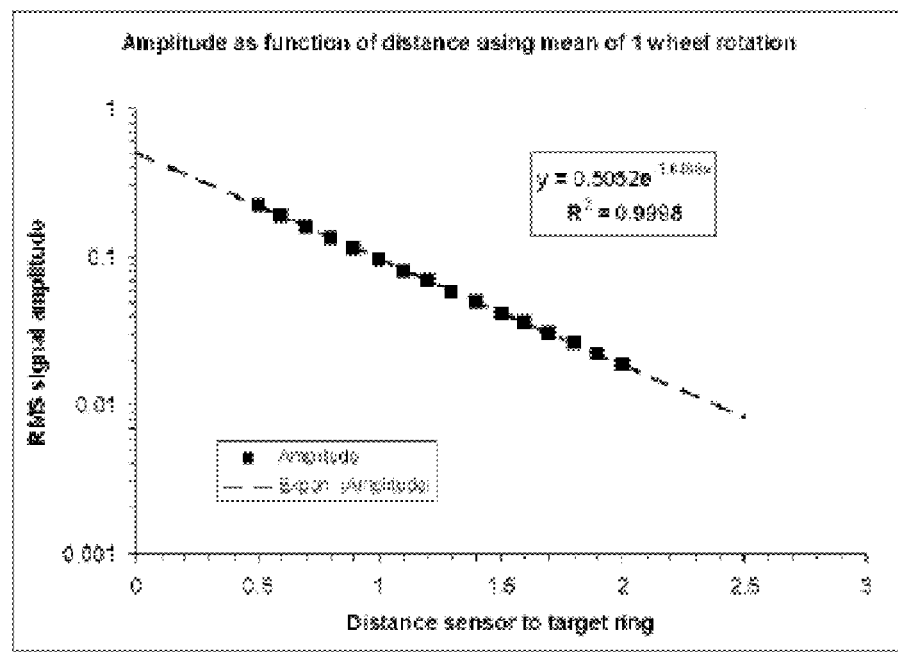
FIG. 5 is a graph illustrating the relation between the width of the gap between the sensor and the target ring and a signal amplitude of the sensor signal.

FIG. 5 is a graph illustrating the relation between the width of the gap G between the sensor 16 and the target ring 18 and signal amplitude of the sensor signal in a logarithmic plot. The straight line in the logarithmic plot indicates an exponential relation, wherein the best fit is indicated as a dashed line, which corresponds to a decay factor of −1.6466 mm−1 in the illustrated example. The exact value of the amplitude depends on the geometry of the magnet and yoke system and on the geometry of the teeth or slots or bars in the magnetically conducting target ring 18.

Figure 6:
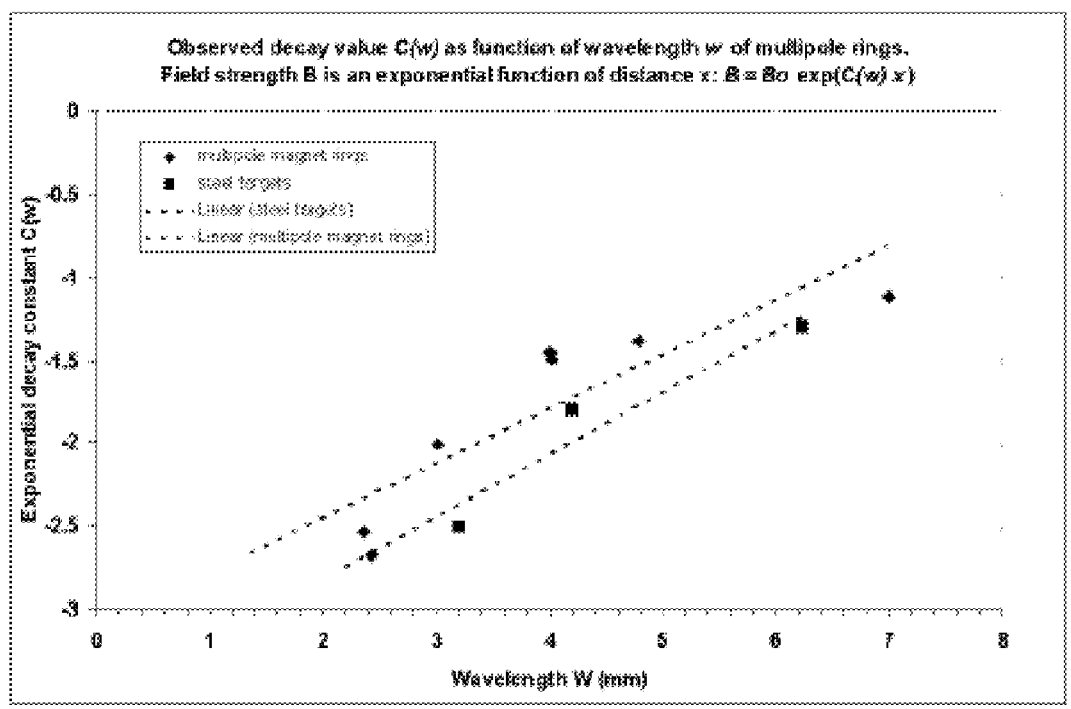
FIG. 6 is a graph illustrating a relation between a pitch wavelength/period of the target ring according to FIG. 2 and an exponential decay constant in the relation illustrated in FIG. 5.

FIG. 6 is a graph illustrating a relation between a pitch wavelength/period of the target ring according to FIG. 2 and an exponential decay constant in the relation illustrated in FIG. 5.

As already discussed above, the value of the exponent is particularly sensitive to the period length w of the target ring, and in minor way to the width of the ring and the radius of curvature. Generally, the exponent value is in the value range of −0.7 to −3.5, and the exponent goes more negative when the period length is decreased. Roughly speaking a period length of 7 mm results in an exponent of about −1 while a period length of 2.5 mm results in an exponent in the order of −2.6.

In order to maximize the accuracy one should maximize the number of pole pairs of the magnet ring. Minimum required is typically 40, whereas the costs increase steeply for more than 100 slots. The circumferential length of one North-south combination is preferably more than 3 mm and less than 6 mm. Using this range of parameters, an exponential decay of −2.3 at 3 mm, −2 at 4 mm and −1.2 for 6 mm can be expected. Similar relationships can be expected for variable reluctance. Hence the manufacturing cost of the target must be balanced against the desired accuracy.

Thus, the period length and the exact geometric adaptations are used to tune the distance measurement to the size and application of the rolling element bearing 10. For a high resolution, short period lengths are favored but the penalty is that the sensor 16 must have a precise location and distance when it is mounted.

In case of a magnetically permeable part such as a gear wheel or slotted disc, the patterns have tolerances in geometry and material composition, and run-out and flatness of the disc or wheel 18. Therefore, the sine waves like variations measured by the Hall sensor are not exact and vary from place to place. Similarly, in case of a magnetic ring, the magnets programmed into the material can vary from location to location. The result is that the signals observed vary slightly in phase and amplitude.

The effect of sine wave amplitude variation is minimized by averaging the amplitude over one rotation. The signal processing unit 26 therefore calculates this average. Doing an average over one rotation yields a very stable reading of the signal amplitude, and it is then possible or calibrate the amplitude as function of distance to the target ring 18, magnet ring or magnetically conducting (permeable) ferritic ring, gear or disc shaped part. The calibration is achieved by storing a suitable characteristic as illustrated in FIG. 4 in a storage unit of the signal processing unit 26.

The shape of the spatial differential magnetic field is also in general not sinusoidal. However by tuning the geometric shape of the gearwheel's teeth, or the geometry of the slots and bars in the sheet steel disc, it is possible to optimize the signal shape and to bring the total harmonic distortion down to practical values, well below 2% THD, so that precision estimates of the average amplitude is not seriously impaired when an average over a little less or more than 360 degrees is made in a practical automated measurement situation.

Using the example data set above, it is estimated how well the distance w of the rotating target ring 18 may be estimated. The first step is the measurement of the response B as function of distance Xactual. The standard deviation on B when rotating the disc is between 45 and 55 times smaller than the B itself. First, the distance is calculated from the average amplitude B from the inverse of the fit model:

$$\text{Distance } X\_estimate = -1/1.64661 * \ln(B/0.5052). \quad (1)$$

The margin in X_estimate with the B+/−3 times standard deviations is 8.5 micrometer.

For the cornering of a car in a strong curve of about 1 G centrifugal force the tire-road contact load in the lateral direction of the car is in the order of 5 kN. The bearing experiences a combined axial load of 5 kN and a corresponding cornering bearing moment of 1.6 kNm. If we can expect a tilt movement of 0.100 mm on the pitch radius of the ABS target ring, a differential movement of 0.200 mm can be measured. Having deduced that, it is possible with an adaptation of an ABS sensor as described above to do this with a resolution of 8.5 micrometer, then the load resolution is in the order of 200 N.

The actual movement of the bearing can be substantial, as experiments have shown.

Figure 7:
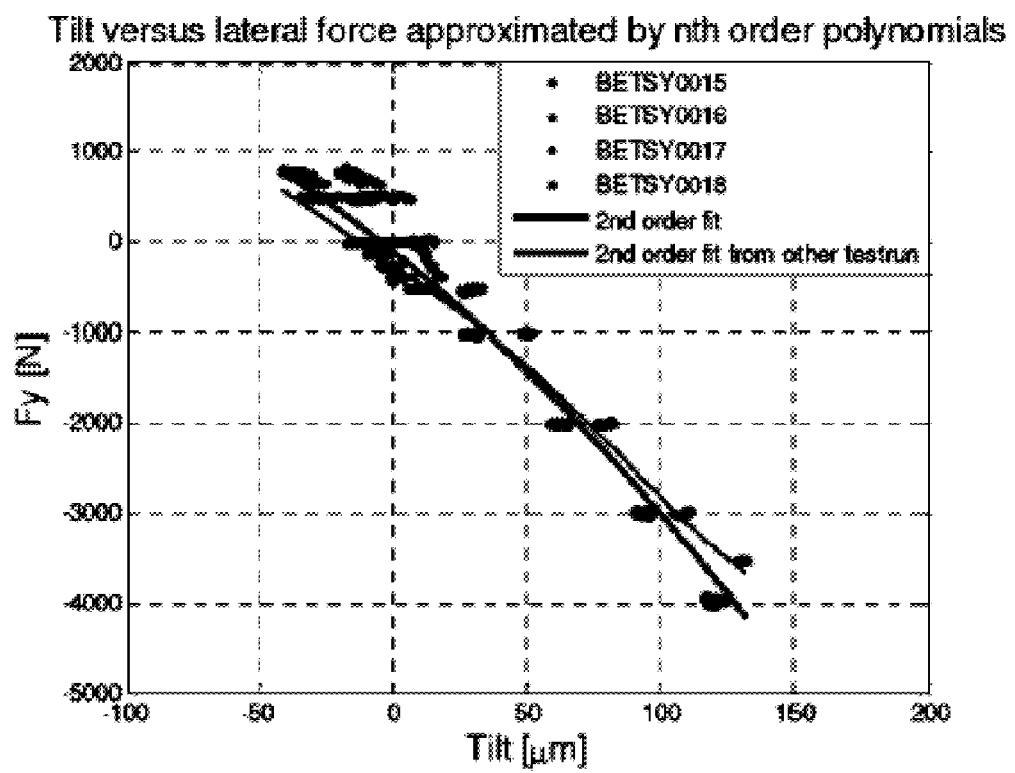
FIG. 7 illustrates a relation between a tilt of the target ring and a lateral force acting on the bearing unit.

FIG. 7 illustrates a relation between a tilt of the target ring and a lateral force acting on the bearing unit. FIG. 7 is a picture of the relative axial movement, measured with eddy current sensors to prove the tilt movement correctness, of the inner ring to the outer ring of the wheel hub unit used in BMW E60 test vehicles as function of cornering forces exerted on the wheel (lateral tire contact force Fy). Several tests delivered similar results.

The fit model applied to the tilt measurement yields an estimation of the lateral force from the tilt movement. The result are indicated as solid lines which may be stored as the characteristic in the signal processing unit.

Figure 8:
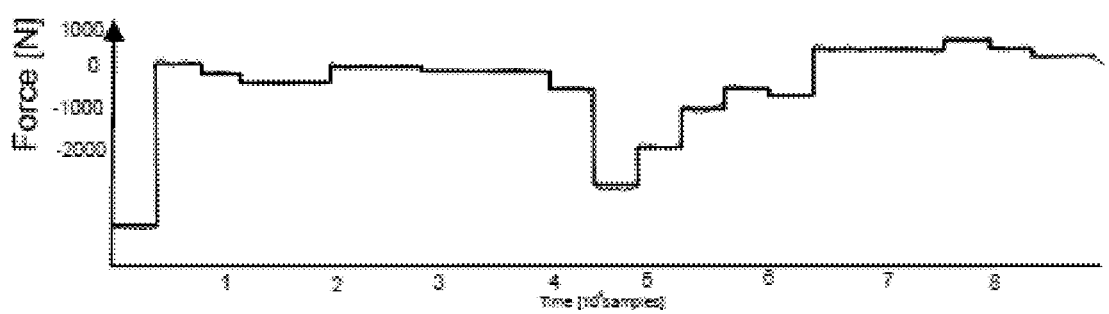
FIG. 8 illustrates a comparison between a lateral force acting on the bearing unit as estimated by the load determining system according to the invention and the lateral force which is actually applied.

FIG. 8 Illustrates a comparison between a lateral force acting on the bearing unit as estimated by the load determining system according to the invention and the lateral force which is actually applied. The comparison shows that a reliable detection of axial forces is feasible using a sensor unit according to the invention.

Figure 9:
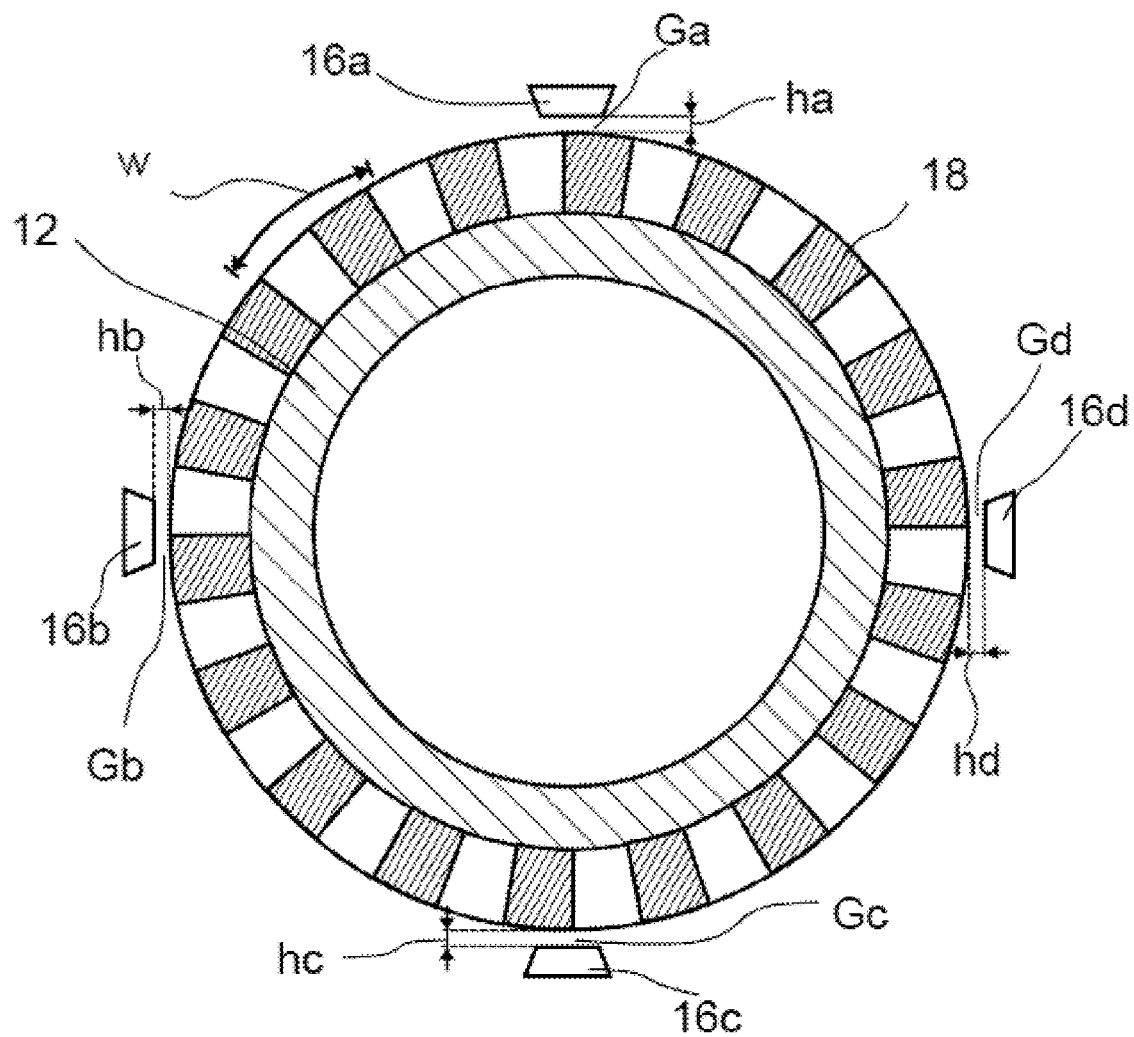
FIG. 9 is a sensor system according to a further embodiment of the invention including four equally spaced magnetic sensors with radial gaps to an encoder ring.

Besides of detecting the load, the signal processing unit 26 may use the sensor information for other purposes, e.g. for monitoring and generating maintenance information. In particular, the signal processing unit 26 may be configured to determine an axial play of the rolling element bearing 10 and to generate a signal representative of a remaining bearing life based on the axial play. FIG. 9 is a sensor system according to a further embodiment of the invention including four magnetic sensors 16a-16d with equal spacing of 90° and with radial orientation, i.e. with radial gaps Ga-Gd between the sensing surfaces of the sensors 16a-16d and a magnetic encoder ring 18, which is attached to the inner ring 12 of a bearing in this embodiment.

Figure 10:
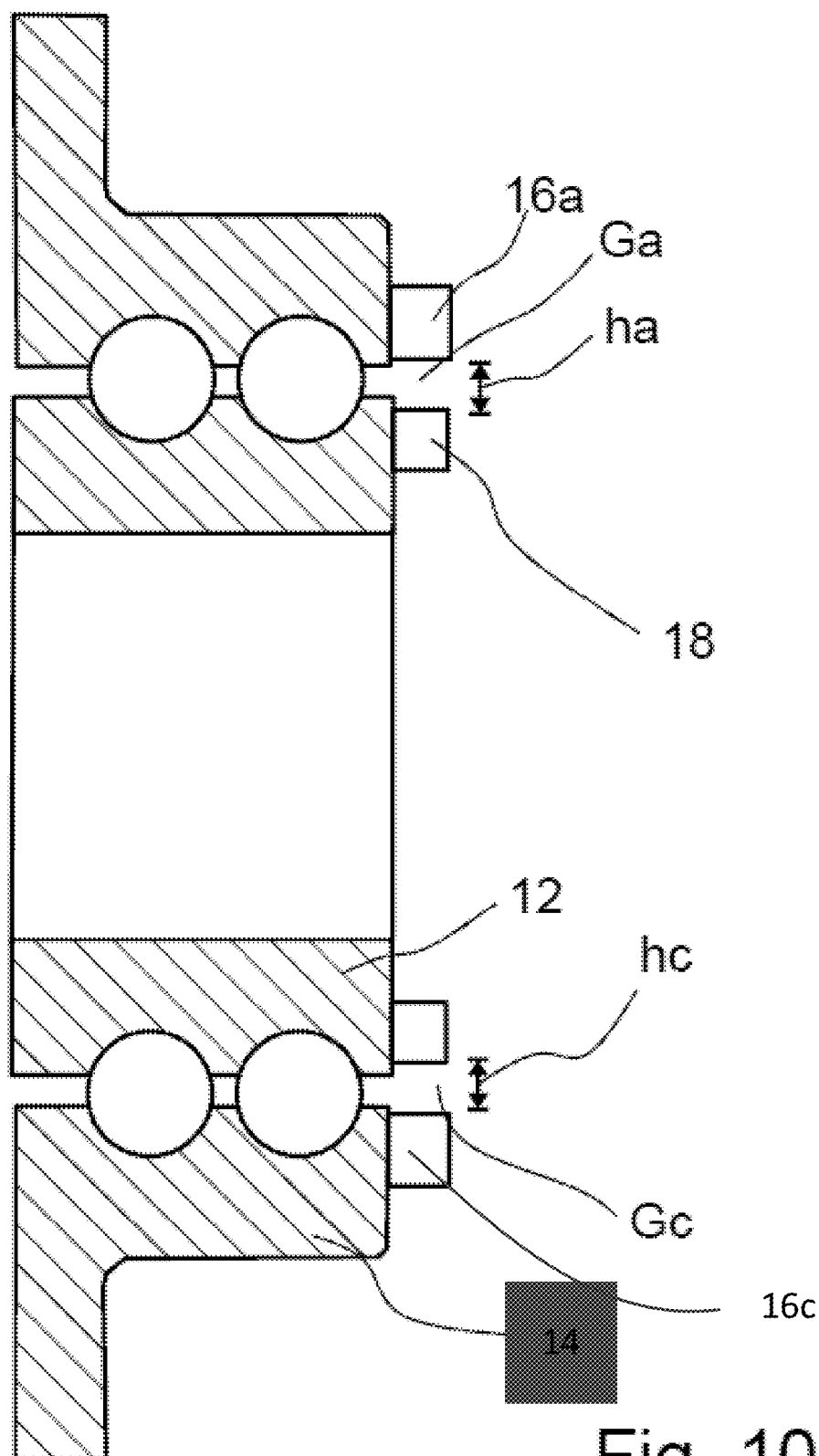
FIG. 10 is a sectional view of the sensor system according to FIG. 9.

FIG. 10 is a sectional view of the sensor system according to FIG. 9. The gaps Ga, Gc have widths h1, h2 in a radial direction of the bearing. When cornering, the inner ring 12 of the wheel bearing in an automobile tilts against the outer ring 14. This results in a change of distance and in the widths ha, hc of some 100 μm on both sides of the bearing. Using at least two sensors opposite to each other allows measuring the tilt. When placing more than one pair of sensors, it is possible to build a deformation model of the bearing unit and measure loads in the different degrees of freedom including runout, tilting, and deformations of the rings.

The invention proposes that the data processing device 26 is configured to process the signals by averaging the measured signal over one or multiple full rotations of the ring. This compensates runout and mounting accuracy of the magnetic ring. Then, the RMS amplitude of the signal is calculated. The RMS value can be calculated using the known integration method, but can also be estimated by rectifying the signal and calculating the moving average. The period of the moving average thereby depends on the speed measured by the ABS sensor function of the data processing device 26.

The distance is estimated using an inverse model of the sensor arrangement (convert mTesla to displacement): $1/k*\ln(x)$ with k being the decay factor of the arrangement mentioned before and x the measured magnetic field strength. The exponential decay is inverted by taking the logarithm. Depending on the model, the inverse function could be adapted. If more than 1 sensor pair has been used, the force vector is calculated using a linearized bearing model.

Figure 11:
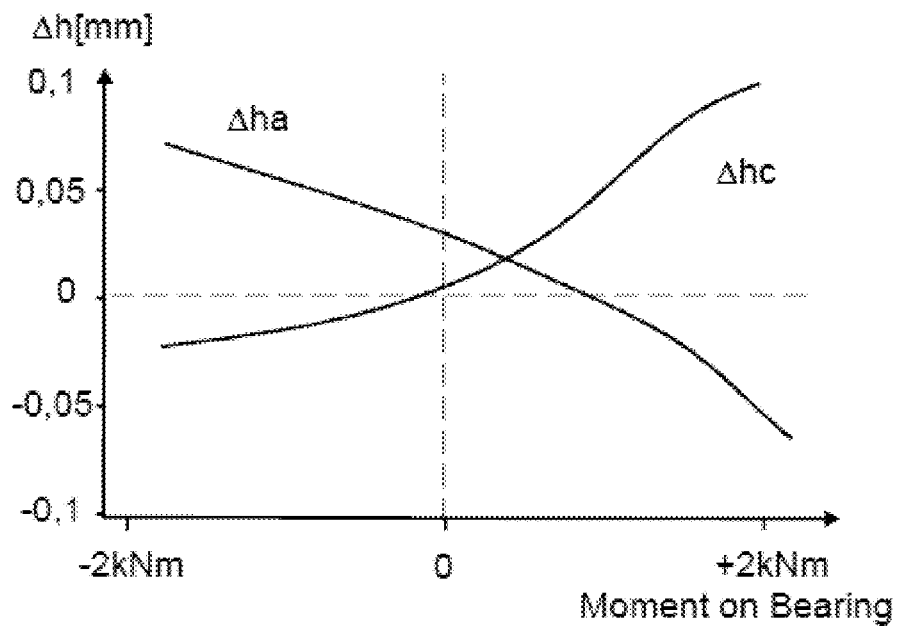
FIG. 11 is a graph showing the values determined for the widths of the gap as determined based on the signals of two of the magnetic sensors of FIGS. 9 and 10.

FIG. 11 is a graph showing the incremental values Δha, Δhb determined for the widths ha, hb of the gaps as determined based on the signals of two of the magnetic sensors of FIGS. 9 and 10. The incremental values Δha, Δhb or height variations differ from the absolute value of the widths ha, hb by a predetermined offset $h_0$. By calculating the logarithm of a ratio of the averaged signals obtained from a pair of sensors mounted at essentially opposite positions, it is possible to eliminate the offset of the signals due to tolerances or runout in a very convenient way. As well known, the logarithm of a ratio of two numbers is the difference of the logarithms of the numbers and constant and identical pre-factors of the numbers will cancel out. The result of the calculation therefore corresponds to the difference of the curves in FIG. 11, which would be a reliable parameter for determining a tilting or cornering force.

Figure 12:
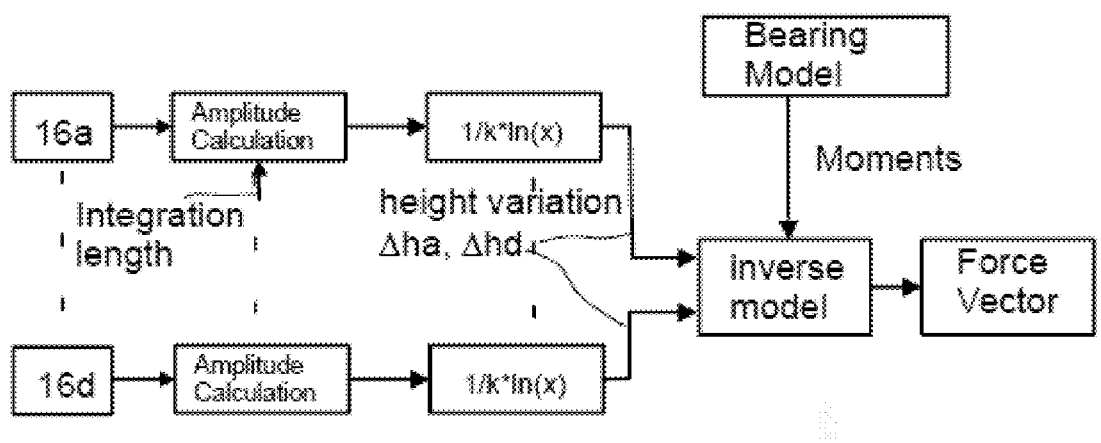
FIG. 12 is a schematic diagram illustrating the data processing performed by the signal processing unit of a system according to the invention for calculating a force vector in real time.

FIG. 12 is a schematic diagram illustrating the data processing performed by the signal processing unit 26 of a system according to the invention for calculating a force vector in real time. For each of the sensors 16a-16d, the height variation Δha-Δhd is calculated by taking a squared average xi or RMS of the signal amplitude, e.g. as $$x_i = \sqrt{\frac{1}{T} \int_t^{t+T} S_i^2(t) dt}$$

wherein Si2(t) is the signal obtained from the respective sensor (i=a, . . . d) and T is the period for averaging in an averaging step S1 and subsequently taking the logarithm of the amplitude xi divided by a decay factor k previously determined in a calibration procedure:

$$\Delta h_i = 1/k \ln(x_i)(i=a, \ldots, d).$$

As mentioned above, the widths can be determined as $$h_i = h_o + \Delta h_i$$

and the logarithm of the ratio of the amplitudes $x_i$, $x_j$ yields $$\ln\left(\frac{x_i}{x_j}\right) \ln(x_i) - \ln(x_j) = k \times (\Delta h_i - \Delta h_j)$$

As noted above, this is proportional to the difference of the curves in FIG. 11, which would be a reliable parameter for determining a tilting or cornering force.

The height variations Δha-Δhd are input to a bearing model accounting for the elastic moduli Mx, My, Mz of the bearing in order to calculate the force vector in real time.

The invention claimed is:

1. A load determining system including a sensorized rolling element bearing in a hub unit for wheels, the bearing including a first ring and a second ring as an inner ring and an outer ring, the first ring being tilted or axially displaced with respect to the second ring by the load acting on the bearing, the system comprising:
   a. at least two magnetic sensors attached to the first ring so as to interact with an target ring attached to the second ring, the target ring is arranged so as to face a sensing surface of the magnetic sensors with a gap (G), the gap (G) is configured so that a width of the gap (G) varies as a function of a tilt angle and of an axial displacement of the rings;
   b. a signal processing unit configured to receive the magnetic sensor output of the at least two magnetic sensors, the signal processing unit is configured to determine at least axial forces acting on the bearing based on the amplitude of the magnetic sensor output, wherein the amplitude depends on the width of the gap (G) between the sensor and the target ring; and wherein the signal processing unit is configured to calculate average values of the output values of the at least two magnetic sensors over a predetermined averaging period (T), respectively, and to calculate a logarithm of the average amplitude of the magnetic sensor outputs and/or a logarithm of a ratio of the average values to determine a load acting on said bearing.

2. The load determining system according to claim 1, wherein the signal processing unit is further configured to calculate a logarithm of the average value of the output values of the at least two magnetic sensors respectively in order to determine the width of the gap (G) at the location of the sensor.

3. The load determining system according to claim 1, wherein the at least two magnetic sensors are arranged at opposite positions on the circumference of the first ring, and wherein the signal processing unit is configured to calculate a tilt of the first ring with regard to the second ring based on the signals obtained from the magnetic sensors.

4. The load determining system according to claim 1, wherein the load determining system comprises multiple magnetic sensors arranged at different positions on a circumference of the first ring, and wherein the signal processing unit is configured to calculate a force vector describing a cornering load acting on the bearing.

5. The load determining system according to claim 1, wherein the target ring is arranged so as to face a sensing surface of the magnetic sensor with an radial gap (G).

6. The load determining system according to claim 1, wherein the magnetic sensor is formed as a differential Hall sensor.

7. The load determining system according to claim 1, wherein the target ring is formed as a slotted magnetically permeable steel ring.

8. The load determining system according to claim 1, wherein the target ring is formed as a target ring with alternating magnetized regions.

9. The load determining system according to claim 1, wherein the signal processing unit is configured to determine a parameter relating to wear of the rolling element bearing and to generate a signal representative of a remaining bearing life based on the parameter.

10. A load determining system including a sensorized rolling element bearing in a hub unit for wheels, the bearing including a first ring and a second ring as an inner ring and an outer ring, the first ring being tilted or axially displaced with respect to the second ring by the load acting on the bearing, the system comprising:
   a. at least two magnetic sensors attached to the first ring so as to interact with an target ring attached to the second ring, wherein the target ring is arranged so as to face a sensing surface of the magnetic sensors with a gap (G), wherein the gap (G) is configured so that a width of the gap (G) varies as a function of a tilt angle and of an axial displacement of the rings;
   b. a signal processing unit configured to receive the magnetic sensor output of the at least two magnetic sensors, wherein the signal processing unit is configured to determine at least axial forces acting on the bearing based on the amplitude of the magnetic sensor output, wherein the amplitude depends on the width of the gap (G) between the sensor and the target ring; and wherein the signal processing unit is configured to calculate average values of the output values of the at least two magnetic sensors over a predetermined averaging period (T), respectively, and to calculate a logarithm of the average amplitude of the magnetic sensor outputs and/or a logarithm of a ratio of the average values to determine a load acting on said bearing used as an ABS system in an automobile.

11. A Method for determining a load acting on a sensorised rolling element bearing in a hub unit for wheels, the bearing including a first ring and a second ring as an inner ring and an outer ring, wherein the first ring is tilted or axially displaced with respect to the second ring by to load acting on the bearing, the method including:
   a. receiving the magnetic sensor output of at least two magnetic sensors attached to the first ring so as to interact with an target ring attached to the second ring, wherein the target ring is arranged so as to face a sensing surface of the magnetic sensor with a gap (G), wherein the gap (G) is configured so that a width of the gap (G) varies as a function of a tilt angle or of an axial displacement of the rings;
   b. calculating least axial forces acting on the bearing based on the amplitudes of the magnetic sensor outputs of the at least two magnetic sensors (16), wherein said amplitudes depend on the width of the gap (G) between the sensor (16) and the target ring (18);
   calculating average values of the output values of the at least two magnetic sensors over a predetermined averaging period (T), and calculating logarithm of the average amplitude of the magnetic sensor outputs and/or a logarithm of a ratio of the average values to determine a load acting on said bearing.

* * * * *